United States Patent [19]

Fehlmann

[11] Patent Number: 5,641,815

[45] Date of Patent: Jun. 24, 1997

[54] BUILDING MATERIAL WITH INCREASED STRENGTH

[76] Inventor: Hans Beat Fehlmann, Post Walchwil, Bahnhofstrasse 4, CH-6318, Walchwil, Switzerland

[21] Appl. No.: 322,173

[22] Filed: Oct. 11, 1994

[30] Foreign Application Priority Data

Oct. 11, 1993 [CH] Switzerland .................. 3046/93

[51] Int. Cl.$^6$ ............................................. C08G 77/00
[52] U.S. Cl. ................... 521/154; 521/100; 106/672; 106/688; 106/703; 106/711; 106/713; 106/716; 106/811; 106/814; 106/816; 106/122
[58] Field of Search ............................. 521/154, 100; 106/672, 688, 703, 711, 713, 716, 811, 814, 816, 122

[56] References Cited

U.S. PATENT DOCUMENTS

| | | | |
|---|---|---|---|
| 4,181,556 | 1/1980 | Fehlmann | 156/292 |
| 4,915,740 | 4/1990 | Sakai et al. | 106/104 |
| 5,073,198 | 12/1991 | Kurz | 106/791 |

*Primary Examiner*—James J. Seidleck
*Assistant Examiner*—Duc Truong
*Attorney, Agent, or Firm*—Haverstock, Garrett & Roberts

[57] ABSTRACT

In order to be able to produce formed elements or building elements with a significantly increased strength with a building material or structural material, it is suggested to provide the material with a largely uniform fine pore structure or a microcellular structure. These fine pores preferably have a diameter in the range of approx. 0.01μ to approx. 5μ and are self-contained. The material contains a reactive binding agent or a reactive matrix material, which can be a cement/water mixture or also a synthetic resin, for example polyurethane, epoxy resin, etc.

3 Claims, No Drawings

BUILDING MATERIAL WITH INCREASED STRENGTH

The present invention deals with a material, a building element or structural element essentially consisting of a material, a process for the production of a material, as well as the use of the material to produce a formed element or a building element or structural element.

Probably the best known and widest used structural and building material, concrete, at a volume weight of approx 2.4 t/m³ is considered heavy and massive. Furthermore, concrete has poor insulation qualities, which is undesired particularly in housing construction.

A myriad of suggested methods exists on how to reduce the density of concrete on the one hand and at the same time improve the insulating qualities, if possible, on the other hand.

GB-A-2 219 548, for example, suggests adding a foaming agent to the concrete in order to produce a so-called "cell-shaped" cement which does result in an increased heat insulation, but at the expense of a reduced strength.

In U.S. Pat. No. 4,040,855, the production of a lightweight concrete is suggested, by incorporating an air-enclosing additive such as foamed polystyrene into the concrete. The weight can thus be reduced to less than 1 t/m³, but again at the expense of the strength.

This technique is also described in several publications, such as, for instance, in the article by P. Cormon, "Bétons légers d'aujourd'hui", 1973 Editions Eyrolles, Paris, pages 156–166, as well as in the article in the concrete magazine Betonstein-Zeitung No. 5 of May 1, 1960, pages 208–212: K. Kohling, "Die Herstellung von Leichtbeton unter Verwendung von vorexpandierten (R) Styropor-Partikeln als Zuschlagstoff".

Similarly, the Canadian Patent No. 1 283 666 suggests to incorporate polystyrene into a lightweight concrete, whereby polypropylene fibers, for instance, are additionally added to the concrete in order to reduce shrinking during curing.

Swiss Patent No. 453 998 deals with the disadvantage of the reduced strength when polystyrene is incorporated, by incorporating for example glass foam as filler material instead, which may be manufactured from quartz sand and soda or bulking stones, for instance, such as pumice stone or tuff.

All suggested solutions such as the foaming of cement or inclusion of gas in building materials, the incorporation of lightweight filler materials such as polystyrene or also the use of glass foam, etc. possess, in addition to the advantage of the lighter-weight concrete, the significant disadvantage of the decreased strength. This needs to be at least partially compensated for in the case of bearing construction elements through the installation of heavy reinforcement bars, through the use of expensive additives such as glass or carbon fibers, or the selection of thicker walls, which is expensive and labor intensive. Additionally such construction elements are significantly more prone to corrosion and cracking.

It is therefore a task of the present invention to suggest a building and structural material or a process with which building or structural parts or elements or structures can be produced with a significantly increased strength.

As a consequence, a further task is the suggestion in an analogous fashion of a material which possesses sufficient strength despite the use of lightweight filler materials, in order to be used for the production of bearing construction elements.

The presented task is solved with a material according to the invention and to the wording in claim 1.

It is suggested that the building or structural material defined according to the invention be characterized through a largely uniform distribution of a fine pore structure.

The diameters of these fine pores are within the range of approx. 0.01µm to approx. 5µm, whereby the individual pores are preferably self-contained.

The material possesses a reactive binding agent in order to enclose these pores or form a matrix, respectively, whereby a chemical hardening reaction takes place when the material is used or applied.

With the above mentioned fine porosity or microcellular structure, a formed element or building element or structural element can be produced with the material suggested according to the invention, the compression strength and tensile strength of which are about three to four times higher than the corresponding compression strength and tensile strength which are obtained with the respective binding agent or material without the fine pore structure. It was shown that, surprisingly, the strength characteristics of the building material or the formed elements produced from the same, can be significantly increased through incorporation of the above mentioned fine pores, apparently due to the very high capillary forces in the individual pores. The tensile strength is increased primarily, which automatically results in the increase of the compression strength.

In this manner it is now possible according to the invention to significantly increase the tensile strength in concrete parts or building elements of concrete without installation of reinforcement bars.

Synthetic resins, such as polyurethane, epoxy resin, polyester resin, silicone resin, acrylic resin, etc. or mineral materials, such as cement, for instance, are particularly suitable as binding agents or matrix material in the material suggested according to the invention.

According to a preferred production method, a cement/water mixture is suggested, whereby the cement/water ratio is approx. 0.24 to approx. 0.4, preferably approx. 0.26 to 0.32.

In addition to the significant advantage that the strength of a construction element manufactured from the material suggested according to the invention can be significantly increased, the weight can be reduced up to approx. 30% depending on the diameter and frequency of the pores. This results in a series of further significant advantages:

- The expensive additives on silicate basis used to increase the strength which have commonly been added until now, will not be required anymore.
- The addition of non-bearing filler materials, and particularly the addition of gravel and sand will not be required anymore since the cement matrix itself is responsible for the high strength.
- Since the cement matrix itself possesses a significantly higher stability than that of today's commonly used building elements, inexpensive lightweight filler materials, such as polystyrene, for instance, can be added to the closed-pore concrete to reduce the weight for the production of cement building elements with a volume weight of approx. 600 kg/m³. However, it is nevertheless possible to produce bearing building elements with concrete containing such lightweight filler material.
- Due to the fine pore structure, the concrete becomes "elastic", i.e. the essentially very stiff concrete with an elastic modulus of approx. 25 to 40 kgN/mm² is given a certain elasticity, whereby the elastic modulus can only be reduced to 3.5 kgN/mm$^2$ before the concrete fractures. It thus becomes possible to construct crack-free structures in civil engineering.

Due to the massive weight reductions it is possible, for example in the construction of ceilings, to select thicker wall thicknesses (higher static height), so that the reinforcement can be reduced. It is thus only necessary to install an additional reinforcement to correct the elastic modulus in order to prevent sagging, for instance of a ceiling system. However, due to the significantly lighter weight of the building material, less reinforcement is required, whereby common standards may be applied.

Due to the porosity of the material according to the invention, such as porous cement for example, this material becomes easier to process since the pores act like "ball bearings". The cement additionally obtains thixotrope characteristics.

Since cement, for example, is thixotrope, a significantly more advantageous water/cement ratio can be used, i.e. less water needs to be added since the material is easier to work with. The water/cement mixture can be selected in a range of approx. 0.25 to 0.4, preferably 0.26 to approx. 0.31.

Since a low water/cement factor may be selected, virtually all "mixing water" is absorbed by the cement.

Due to the low water content in the construction element, the element dries within as little as approx. one week after setting.

Since no excess water is present, no open capillaries result, i.e. the construction element according to the invention is massive. Elements with open pores result at water/cement factors of approx. 0.4 to 0.55.

Due to the fact that no open capillaries exist, the corrosion resistance of the construction element is significantly increased. Aggressive substances, such as salt, or other aggressive media, can therefore not enter into the construction element. This automatically results in an increased frost resistance.

Concrete structures which are constructed with the cement as defined according to the invention can have the forms immediately removed. Furthermore, the concrete ceases to shrink after already seven days, with a significantly lower overall shrinkage.

No segregation of the mixture takes place in the building material or structural material when aggregates are added.

Use of the building material or structural material as defined by the invention makes it possible to obtain insulation values or a k-value of 0.3 (W/m$^2$K) and better in building or structural elements.

Particularly in countries where little or no gravel and sand are available, use of the building and structural material suggested according to the invention is advantageous since it is not necessary to add gravel and sand. This particularly applies to countries like Japan or regions in the Middle East, where no salt-free sand or gravel exists.

The list of advantages of the material according to the invention only comprises the most important advantages and is not to be considered all-inclusive.

Further preparation variations of the building and structural material according to the invention are characterized in the dependent claims.

The above defined structural or building materials according to the invention are particularly suitable for the production of building or structural elements or parts, as well as for entire structures. These building or structural elements may be unreinforced due to the increased strength of the used building material, or have additional reinforcements, for instance through interior reinforcement bars such as an steel reinforcement. Reinforcement, however, is also possible through inclusion of fibers, for instance glass or carbon fibers.

It is self-understood that the idea according to the invention of incorporating a fine pore structure into a material is not restricted to hydraulic binding agents, such as cement, for instance, but can also be applied to synthetic resins, for example polyurethane, epoxy resins, etc. Combinations are also possible, of course, for instance by adding a synthetic resin to the hydraulic binding agent in the so-called concrete polymer, for instance in order to increase the strength of the formed element or construction element to be manufactured.

A process according to claim 14 or 16 is suggested for the production of a building material or structural material according to the invention.

Accordingly it is suggested to mix a reactive binding agent, or the different reaction components, together with additives and aggregates if appropriate, in a high turbulence mixer. Through this high turbulence mixing the fine pores significant to the invention are incorporated into the material in order to create a uniform distribution of the fine pore structure.

As opposed to the prior art, where air entrainment and pores, for example in cement or cement mixtures or synthetic resin mixtures are entered into the material through gas-developing agents, foaming additives, aerosols, plastic foams or lightweight filler materials, creation of the fine pore structure is here mainly achieved with a mixer. The difference to the prior art is mainly shown by the fact that considerably larger pore diameters are measured in the case of air entrainment in the prior art, for example in the range of 100 to 200 μ, and that closed-pore air entrainments of <20μ are generally viewed as unfavorable, although, surprisingly, these are responsible for the higher strength values.

According to a further process according to the invention for manufacturing the material suggested according to the invention including the fine pore structure significant to the invention it is also possible to produce this fine pore structure in a low-speed mixer, for example a common cement mixer, by adding additives to the material formulation in the amount of up to approx. 1.5% of the weight of the cement, for example additives which enhance the flow characteristics or liquefying additives, for example on the basis of ammonia. Adding tensides or thixotroping agents is also possible, but if these are used, it needs to be ensured that the pores developing during the mixing process do not get too large since, as defined above, it is significant for the invention that the pore size is not larger than 5μ. It is these fine pores as defined according to the invention, that lead to the high capillary forces which result in the increased tensile strength and compression strength in the formed or building elements.

If aggregates are mixed into the material formulation, for example sand, gravel, lightweight filler materials etc., it is advantageous if all components of the material formulation are either mixed simultaneously in the high turbulence mixer or, according to the second process variation, in a normal mixer. If cement mixtures are produced in a high-speed mixer it has proven advantageous to first mix the cement/aggregate mixture at a low speed and then add water in the high-speed mixing range.

During processing of the building material or structural material according to the invention one needs to ensure that the temperature does not get too high during the curing process, i.e. that it does not increase into a range where one of the components of the material starts to evaporate. In the case of a water/cement mixture, for instance, the maximum temperature of 60° to 80° C. should not be exceeded. Particularly if large blocks, for instance, are to be cast, cooling coils should be installed in order to reduce too high reaction temperatures to the stated maximum values. On the other hand, however, it is possible particularly with cement mixtures according to the invention to perform concrete work also at temperatures below 0° C. due to the low water content, since the setting temperature is higher than the cooling of the material by the environment.

Due to the numerous, completely new characteristics of building and structural materials as defined by the invention, it is also possible to use these materials for uncommon purposes. A pure cement/water mixture can be used, for example, everywhere where high strength values are required, without the necessity of additional reinforcements. Reference is made, as an example, to the sub-base of railroad tracks where concrete defined according to the invention possesses sufficient strength in order to also meet the higher requirements for the now popular high speed trains. However, it is also possible to construct ceilings in structures where the highest strength reinforcements are used to prevent the ceiling from sagging but not in order to obtain sufficient strength.

The same, of course, also applies for the use of synthetic resin formulations, where an increased strength was usually obtained at the expense of the elasticity. In order to obtain a high stability in a formed element, the cross-linking density usually had to be increased, or expensive filler materials, such as glass fibers, carbon fibers or the nowadays popular aramide fibers had to be used.

An increased cross-linking density, however, generally led to an increased brittleness.

The fine porous structure, on the other hand, increases the strength without increasing the cross-linking density, whereby the elasticity in the formed element is also increased at the same time. The fact that compression strength is increased although the elasticity can also be increased at the same time is a completely new aspect. Reinforced synthetic materials, for instance, can thus be produced for which a matrix according to the invention is used, which possesses an increased strength without increased cross-linking density. The matrix nevertheless possesses an increased elasticity, whereby the brittleness of such materials can be significantly reduced. Particularly in vehicle construction, such as automobile construction, as well as in aviation-type construction, for instance in airplanes, this might prove to be a highly interesting aspect.

The invention shall be explained in more detail with the following examples.

EXAMPLE 1

Cement Formulation: 100% vol. cement are mixed with 40% vol. water, for example 20 kg cement with 8 kg water. The mixture is mixed in a high turbulence mixer, for example a wing mixer at 1500 revolutions.

A compression strength of 500 to 700 kg/cm$^2$ was measured in the formed elements cast from this mixture, as well as a tensile strength of 130 to 160 kg/cm$^2$.

EXAMPLE 2

Cement/Polystyrene Mixture:

A mixture of 100% vol. cement and 30% vol. water was mixed with a lightweight filler material, for example polystyrene pellets. The lightweight filler material portion of the mixture amounted to 950 l/m$^3$ of the cement mixture. The mixture further contained altogether approx. 1% of a common foaming agent, such as soap or a fat acid and a liquefying agent on ammonia basis.

The mixture was mixed in a common cement mixer at approx. 20 rotations, and subsequently used to cast formed elements. These were determined to have a volume weight of 900 kg/m$^3$.

Compression strength approx. 85 kg/cm$^2$

Tensile strength approx. 32 kg/cm$^2$

Mixtures with the same recipe but without the addition of a foaming agent and without liquefying agent were produced in the same concrete or cement mixer and formed elements were subsequently cast in which virtually no strength could be measured since the microcellular structure was missing in the cement matrix.

Especially the lightweight building material produced according to example 2 is particularly suitable for the production of so-called prefabricated construction elements or construction parts, for example for the production of cement building blocks. These can be both massive as well as compact cement building blocks, which may be produced by casting the fluid mixture into hollow shaped, square or rectangular forms.

With the two or more-sided design of the form and incorporation of interior air entrainment, concrete blocks of the known kind may also be manufactured which contain hollow spaces or air entrainment. These concrete blocks may be cast according to the country-specific standards.

Concrete blocks which are produced in such a fashion which contain a mixture according to example 2, for instance, have the great advantage of weighing considerably less than common concrete blocks, but possess at least the same strength and also have a heat insulating effect. Such concrete stones with a mixture according to example 2, possess a k-value (heat conductivity value) of approx. 0.1 to 0.2 W/mK. It is thus possible to build walls with such concrete stones according to the invention, which possess the required strength and the required heat insulation value, without having to erect expensive and labor-intensive double walls. This also makes an installation of an exterior insulation layer unnecessary.

A further advantage in the production of so-called prefabricated concrete blocks consists of the fact that particularly in the case of a very low cement/water factor of approx. 0.26%, formed elements can be manufactured after casting of the concrete manufactured according to the invention and brief vibrating that already possess a certain strength after a very short time, so that an immediate removal from the form becomes possible. Due to this so-called early setting of the concrete, such pre-fabricated concrete blocks can be produced much faster than with regular cement which does not contain the microcellular structure according to the invention.

The list of possible suitable applications of building or structural materials defined according to the invention is inexhaustible and therefore not limited to the above listed examples. These only serve for the purpose of demonstrating the characteristics of the building material or structural material according to the invention and to explain the invention in more detail.

I claim:

1. A porous hydrate cement product having a generally uniform distribution of fine pores after mix-up wherein said cement product is obtained by a process of mixing a cement composition in a high turbulence mixer, which mixes the cement composition at a speed of approximately 1500 revolutions per minute, for a sufficient period of time wherein after mix-up said pores in said cement product have a diameter ranging between about 0.01 micrometers and about 5 micrometers.

2. The composition of claim 1 wherein aggregates are added to said composition, said aggregates being selected from the group consisting of sand, gravel, and lightweight filler material.

3. The composition of claim 2 wherein said lightweight filler material has a density of less than 0.1 gm/cm$^3$ is selected from the group consisting of glass fibers, polystyrene, carbon fibers, aramide fibers, and combinations thereof.

* * * * *